United States Patent [19]

Shields et al.

[11] Patent Number: 4,816,723
[45] Date of Patent: Mar. 28, 1989

[54] VARIABLE SPEED MOTOR CONTROL METHOD AND APPARATUS

[75] Inventors: Michael B. Shields, San Carlos; Barrett E. Guisinger, Saratoga, both of Calif.

[73] Assignee: Sony Corporation, Tokyo, Japan

[21] Appl. No.: 176,884

[22] Filed: Apr. 4, 1988

[51] Int. Cl.$^4$ .............................................. H02P 5/16
[52] U.S. Cl. .................................... 318/318; 318/314
[58] Field of Search ............... 318/318, 314, 341, 607, 318/317

[56] References Cited

U.S. PATENT DOCUMENTS

| | | | |
|---|---|---|---|
| 3,564,368 | 2/1971 | Kelling | 318/314 |
| 4,177,411 | 12/1979 | Takaoka | 318/318 X |
| 4,203,061 | 5/1980 | Minakuchi | 318/318 X |
| 4,211,964 | 7/1980 | Yabu | 318/318 X |
| 4,258,300 | 3/1981 | Fromont | 318/318 |
| 4,376,914 | 3/1983 | Kimura | 318/318 |
| 4,418,304 | 11/1983 | Iwai | 318/314 X |
| 4,460,853 | 7/1984 | Quinn | 318/314 X |
| 4,511,830 | 4/1985 | Yamada | 318/257 X |
| 4,551,661 | 11/1985 | Wachi | 318/329 X |
| 4,731,571 | 3/1988 | Donley | 314/314 X |

*Primary Examiner*—Benjamin Dobeck
*Attorney, Agent, or Firm*—Alfred A. Equitz

[57] ABSTRACT

A motor control method and apparatus employing a speed control loop and a phase control loop, each of which receives a clock signal (F_TACH) indicative of the motor's measured phase and rotational frequency, and a synchronizing clock signal (F_SYNC) indicative of the desired motor operating speed control loop generates two analog voltage signals, V_TACH and V_SYNC, from frequency signals F_TACH and F_SYNC, and generates an error voltage signal proportional to the difference between these two voltage signals. Each frequency signal is first converted into a binary number signal proportional to the associated motor period (inverse frequency). Each such binary number signal is then converted to an analog voltage signal having magnitude proportional to the motor frequency. Each analog voltage signal is thus produced by a two-step process employing the successive reciprocal (division) elements. The nonlinearities introduced by the successive reciprocal elements substantially cancel so that each analog voltage signal is linear with motor speed. The speed, accuracy, and linearity of this frequency-to-voltage conversion method allows continuously variable speed operation with constant loop parameters and wide loop bandwidth. The phase control loop of the invention includes a ramp generator, and a sample and hold unit. The ramp generator integrates the frequency derived voltage V_SYNC. Thus, the ramp's amplitude is constant regardless of variations in the frequency of signal F_SYNC, and the phase control loop is adapted for continuously variable speed operation. The ramp voltage is sampled by F_TACH, the sampled voltage is amplified and employed as an error signal for controlling the motor phase.

14 Claims, 2 Drawing Sheets

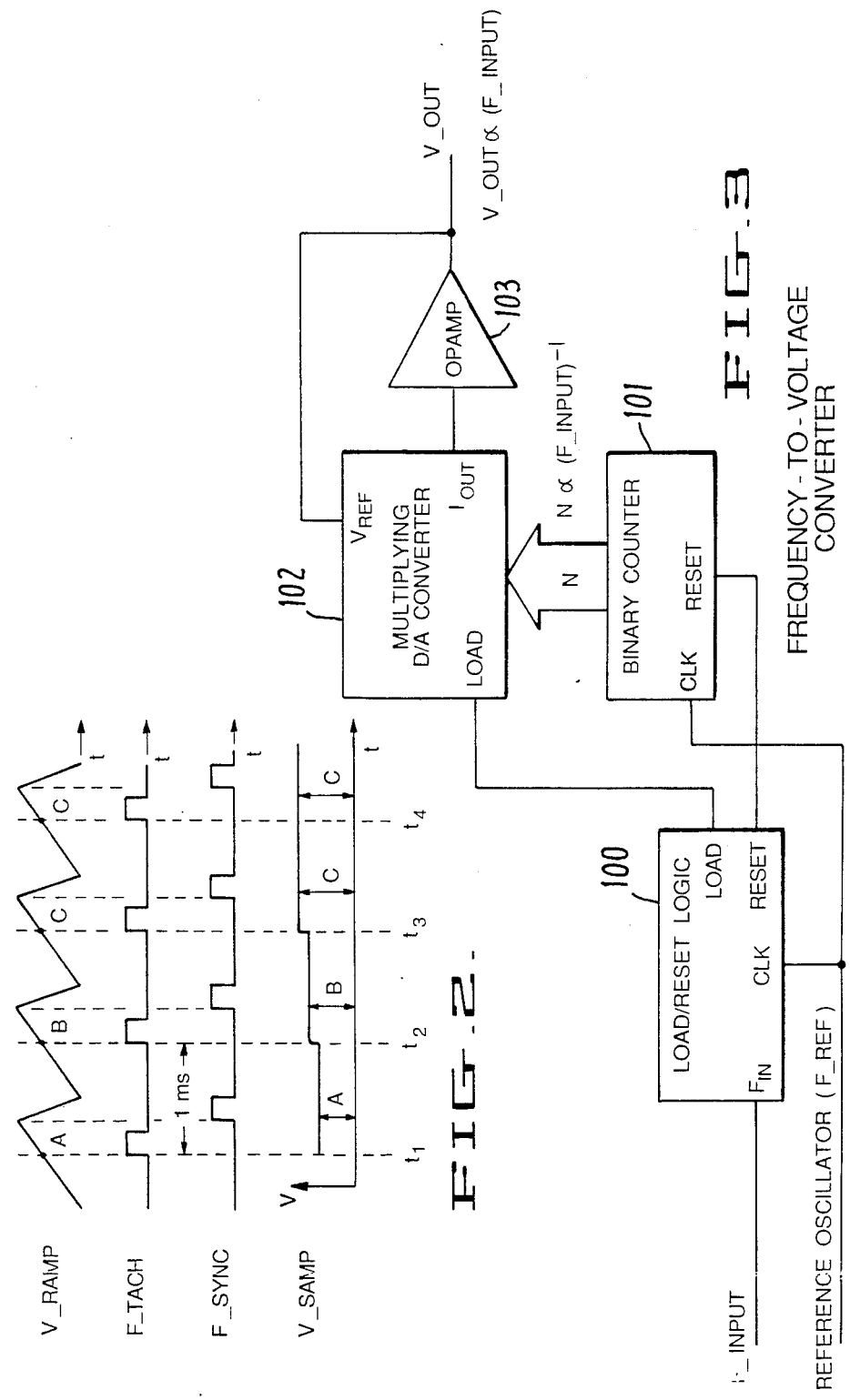

VARIABLE SPEED MOTOR CONTROL METHOD AND APPARATUS

FIELD OF THE INVENTION

This invention relates to motor control methods and apparatus for accurately controlling the rotational frequency and phase of a motor. More particularly, the invention relates to motor control methods and apparatus capable of rapidly and accurately controlling the phase of a motor, and rapidly and accurately setting the rotational frequency of the motor to any selected value within a wide and continuous range.

BACKGROUND OF THE INVENTION

In a variety of systems, such as magnetic recording systems having motors for driving the capstan of a tape recording unit, is important to set the rotational frequency (speed) and phase of a motor rapidly and accurately. Due to the complex dynamics of motors and phase-lock loops, conventional motor control circuits have typically been designed to have a both a speed control loop and a separate phase control loop.

Conventional speed control loops typically derive an error voltage from the motor's rotational frequency, or from the motor's period of rotation. This error voltage is fed back and compared with a reference voltage so that a correcting voltage can be generated and applied to the motor.

In conventional speed control loops of the type employing frequency-to-voltage conversion, a constant quantity of electric charge is typically transferred per cycle, and this charge is integrated or averaged to obtain the error voltage. This type of circuit is capable of achieving low input frequency ripple at the output, but is characterized by low dynamic response (i.e., low frequency-to-voltage conversion speed).

Because period-to-voltage conversion can be accomplished more rapidly (i.e., during a single motor cycle), period-to-voltage conversion is often employed instead of frequency-to-voltage conversion in conventional systems. However, conventional speed control loops employing period-to-voltage conversion are not stable over a wide range of motor speeds. The reason for this instability is that, because rotational period is the inverse of rotational frequency, period-derived error voltage signals are reciprocally rather than linearly related to motor speed. Conventional period-to-voltage speed control loops thus include a strong nonlinearity (such as a reciprocal or division element) which causes difficulty in maintaining loop stability over a wide range of motor speeds. Thus, use of period-to-voltage speed control circuits has typically been limited to applications in which the motor has only a single speed, or a few, switch-selectable speeds. Where the motor has more than one switch-selectable operating speed, it has usually been necessary to switch between discrete sets of loop parameters in conventional systems each time a different motor speed is selected.

It has not been known until the present invention how to achieve highly accurate motor speed and phase control over a wide and continuous range of motor speed and phase, with high dynamic response, and with constant loop parameters.

SUMMARY OF THE INVENTION

The invention is a motor control method and apparatus employing a speed control loop and a phase control loop, each of which receives a clock signal (F_TACH) indicative of the motor's rotational frequency and phase, and a synchronizing clock signal (F_SYNC) indicative of the desired operating speed (rotational frequency) and phase for the motor. The speed control loop generates two analog voltage signals, V_TACH and V_SYNC, from signals F_TACH and F_SYNC (referred to as "frequency" signals), respectively, and generates an error voltage signal proportional to the difference between these two voltage signals.

Each frequency signal is first converted into a digital signal indicative of the associated period (inverse frequency). Each such digital signal is then converted to an analog voltage signal having magnitude proportional to the inverse of the associated period. In a preferred embodiment, the periods are measured digitally by crystal-clocked counters, and the analog voltage signals are generated by reverse-connected, high-resolution multiplying digital-to-analog converters. Each analog voltage signal is thus produced by a two-step process employing successive reciprocal (division) elements. The nonlinearities introduced by the successive reciprocal elements substantially cancel so that the analog voltage signal is linear with motor speed (rotational frequency). The speed, accuracy, and linearity of this frequency-to-voltage conversion method allows continuously variable speed operation of the circuit with constant loop parameters and wide loop bandwidth.

The phase control loop of the invention includes a ramp generator, and a sample and hold unit. The ramp generator integrates the frequency derived voltage V_SYNC. Thus, the ramp's amplitude is constant for different frequencies F_SYNC, and the phase control loop is adapted for continuously variable speed operation. The ramp voltage is sampled by F_TACH, the sampled voltage is amplified in a gain amplifier, and the amplified voltage is then applied to the motor.

BRIEF DESCRIPTION OF THE DRAWINGS

FIG. 2 is a set of graphs of four voltage signals of the type produced during operation of the FIG. 1 circuit. For each graph, vertical and horizontal displacement, respectively, corresponds to voltage and time.

FIG. 3 is a circuit diagram of a preferred embodiment of the frequency-to-voltage converter circuit employed in the FIG. 1 circuit.

DETAILED DESCRIPTION OF THE PREFERRED EMBODIMENT

Figure 1:
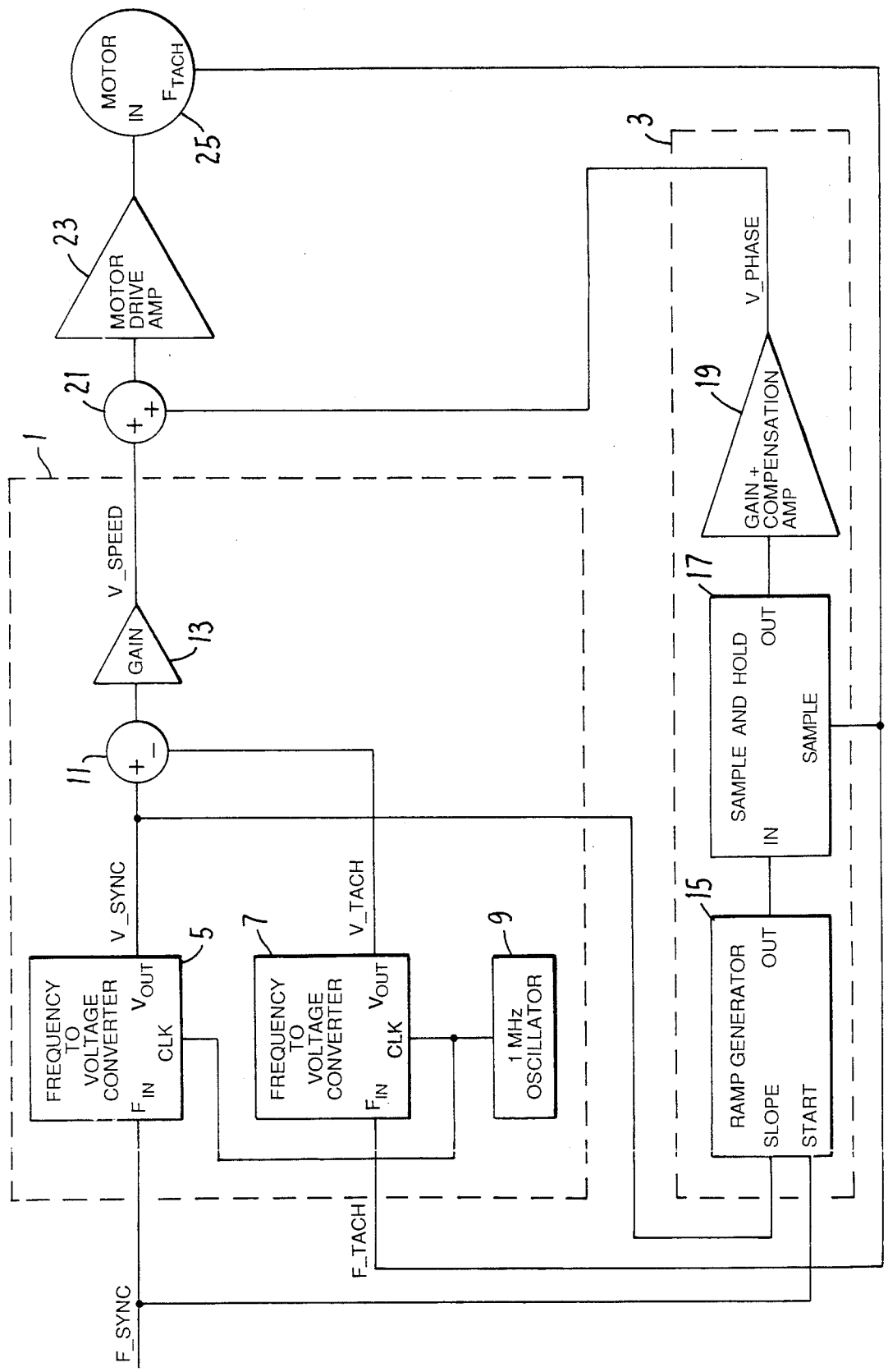
FIG. 1 is a circuit diagram of a preferred embodiment of the motor control circuit of the invention.

The circuit of the invention functions to control the speed (rotational frequency) and phase of motor 25. A conventional tachometer (not shown in FIG. 1) generates a clock signal F_TACH, of the type shown in FIG. 2. Signal F_TACH consists of a sequence of pulses, one pulse for each cycle (or cycle portion) of motor 25. The time between successive pulses is thus the rotational period of motor 25 (or a known fraction of such period), and may typically be on the order of one millisecond.

The circuit of the invention includes speed control loop 1 and phase control loop 3. Signal F_TACH is supplied to speed control loop 1 and phase control loop 3. A synchronizing clock signal F_SYNC is also supplied to speed control loop 1 and phase control loop 3. The frequency of signal F_SYNC is the desired rotational frequency of motor 25. An important advantage of the invention is that, as the frequency of signal F—SYNC is continuously varied over a wide range (e.g., a range of 20 to 1), the invention will accurately control motor 25 without the need to switch any circuit parameters.

Loop 1 generates an analog error voltage signal V—SPEED, whose amplitude is proportional to the difference between the desired motor speed (the frequency of signal F—SYNC) and the instantaneous actual motor speed (the frequency of signal F—TACH). Loop 3 generates an analog voltage error signal V—PHASE, whose amplitude is proportional to the phase difference between the signals F—SYNC and F—TACH. The error signals V—SPEED and V—PHASE are summed in addition unit 21, and the combined error signal emerging from unit 21 is applied to motor drive amplifier 23. The amplified motor control signal emerging from motor drive amplifier 23 is supplied to motor 25.

Speed control loop 1 includes identical frequency-to-voltage conversion elements 5 and 7, to be described in more detail below with reference to FIG. 3. Each of elements 5 and 7 receives a crystal clock signal (which has frequency equal to 1 MHz in the embodiment shown in FIG. 1) generated in crystal clock oscillator 9. Element 5 receives signal F—SYNC, and generates analog voltage signal V—SYNC therefrom. Element 7 receives signal F—TACH, and generates analog voltage signal V—TACH therefrom. The amplitudes of V—SYNC and V—TACH, respectively, are proportional to the frequencies of signals F—SYNC and F—TACH. Signal V—TACH is subtracted from signal V—SYNC in difference amplifier 11, and the difference signal emerging from amplifier 11 is amplified in gain amplifier 13. The amplified difference signal emerging from amplifier 13 is the error signal V—SPEED.

Phase control loop 3 includes ramp generator 15, sample and hold unit 17, and compensation and gain amplifier 19. Ramp generator 15 integrates signal V—SYNC to form a ramp signal, which is shown as signal V—RAMP in FIG. 2. The integration process is restarted at the beginning of each cycle of F—SYNC. In the embodiment represented by FIG. 2, F—SYNCH includes one pulse for each cycle, so that the start of each integration cycle coincides with the leading edge of each pulse of F—SYNC. Of course, it should be appreciated that any fixed number, N, of pulses of signal F—SYNC may correspond to a motor cycle, so that the integration process is restarted in general on the Nth pulse of signal F—SYNC.

Because the frequency-derived signal V—SYNC is integrated instead of a fixed voltage, the maximum amplitude of V—RAMP will be constant, regardless of variations in the frequency of signal F—SYNC. Thus, phase control loop 3 is adapted for stable operation over a wide and continuous range of motor speeds, without the need for variation of loop parameters. The ramp signal from ramp generator 15 is supplied to the input terminal of sample and hold unit 17. The signal F—TACH is supplied to the sample terminal of unit 17. In general, the sampled signal (V—SAMP) emerging from unit 17 will have time-varying amplitude. For example, as indicated in FIG. 2, the amplitude of V—SAMP between times t1 and t2 is A volts, the amplitude of V—SAMP between times t2 and t3 is B volts, and the amplitude of V—SAMP after t3 is C volts. The sampled signal V—SAMP emerging from unit 17 is supplied to compensation and gain amplifier 19. Amplifier 19 includes a conventional lead compensation network for stabilizing the overall phase loop. The output of amplifier 19 is the error voltage signal V—PHASE. When the loop is phase-locked, the amplitude of signal V—PHASE will be zero volts, and sample and hold unit 17 will be sampling at the midpoint of the ramp.

A suitable ramp generator 15, sample and hold circuit 17, and compensation and gain amplifier 19 may be selected from those commercially available.

FIG. 3 is a diagram of a preferred embodiment of a frequency-to-voltage conversion circuit of the type suitable for use as circuit 5 or 7 of FIG. 1. The conversion circuit of FIG. 3 includes load/reset logic unit 100 and digital counter 101, each of which is clocked by a reference oscillator signal F—REF, which reference oscillator signal may be the clock signal supplied by crystal oscillator 9 of FIG. 1. On the leading edge of each cycle of input clock signal F—INPUT (which is signal F—SYNC for circuit 7 and is signal F—TACH for circuit 9), whose frequency is to be measured, load/reset unit 100 generates a LOAD pulse and a RESET pulse. The RESET pulse is supplied to counter 101 to reset that counter. The LOAD pulse is supplied to digital-to-analog conversion unit 102, to cause unit 102 to load the content of counter 101. Counter 101 thus supplies a binary number N to unit 102, where N is the period of F—INPUT in units of cycles of F—REF. Since the number N is reciprocally related to the frequency of signal F—INPUT, counter 101 is properly denoted as a "reciprocal" element (or division element).

Digital-to-analog conversion unit 102 ("DAC" 102) is preferably a conventional multiplying converter configured in a conventional manner for division. The output of DAC 102 is an analog current signal $I_{OUT}$ whose amplitude is proportional to the amplitude of a reference signal ($V_{REF}$) divided by the amplitude of a second signal, where the second signal is an analog signal having amplitude proportional to the digital input (binary number N). Output signal $I_{OUT}$ is supplied to the input of op amp 103. The output of op amp 103 is the output voltage signal V—OUT (which is V—SYNC for circuit 5 and V—TACH for circuit 7). Reference voltage signal $V_{REF}$ is a portion of signal V—OUT which is fed back to DAC 102 in a conventional manner.

Because the amplitude of output voltage signal V—OUT is reciprocally related to the magnitude of binary number N, the amplitude of output voltage signal V—OUT is linearly related to the frequency of input signal F—INPUT. DAC 102 is thus a second reciprocal element (or "division" element) which has the effect of cancelling the nonlinearity introduced by counter 101, the other reciprocal element in FIG. 3. Accordingly, when incorporated in the FIG. 1 circuit, the FIG. 3 circuit does not introduce a strong nonlinearity of the type which causes loop instability in conventional speed control loops which generate period-derived voltages (in contrast with frequency-derived voltages). Furthermore, when incorporated in the FIG. 1 circuit, the circuit of FIG. 3 allows speed control loop 1 to operate much more rapidly (i.e., with much greater conversion speed) than do conventional speed control loops which generate frequency-derived voltages (in contrast with period-derived voltages).

A suitable load/reset logic unit 100, digital counter 101, DAC unit 102, and op amp 103 may be selected from those commercially available.

The foregoing is merely illustrative and explanatory of the invention. Various changes in the methods and components described herein, and in the interconnections between the components described herein, and in other details of the preferred embodiment described herein may be within the scope of the appended claims.

What is claimed is:

1. A motor control circuit, for generating a motor control signal from a first clock signal indicative of the measured phase and frequency of a motor and a second clock signal indicative of a desired operating frequency for the motor, including:

a speed control loop for generating a first error voltage signal having an amplitude proportional to the difference between the frequency of the first clock signal and the frequency of the second clock signal, said speed control loop including a first reciprocal element which receives one of the clock signals and processes said one of the clock signals in a manner introducing a first nonlinearity into the speed control loop, and a second reciprocal element which receives the output of the first reciprocal element and introduces a second nonlinearity into the speed control loop substantially cancelling the first nonlinearity.

2. A motor control circuit, for generating a motor control signal from a first clock signal indicative of the measured phase and frequency of a motor and a second clock signal indicative of a desired operating frequency for the motor, including:

a speed control loop for generating a first error voltage signal having an amplitude proportional to the difference between the frequency of the first clock signal and the frequency of the second clock signal, said speed control loop including a first reciprocal element which receives one of the clock signals and processes said one of the clock signals in a manner introducing a first nonlinearity into the speed control loop, and a second reciprocal element which receives the output of the first reciprocal element and introduces a second nonlinearity into the speed control loop substantially cancelling the first nonlinearity, wherein the first reciprocal element includes a first digital counter which receives the first clock signal and converts the first clock signal into a first binary number signal proportional to the inverse of the measured motor frequency, and wherein, the second reciprocal element includes a digital-to-analog converter which receives the first binary number signal and generates form the first binary number signal a first analog voltage signal having magnitude proportional to the measured motor frequency, and wherein the speed control loop includes means for generating the first error voltage signal from the first analog voltage signal and the second clock signal.

3. The motor control circuit of claim 2, wherein the speed control loop also includes:

a third reciprocal element including a second digital counter which receives the second clock signal and converts the second clock signal into a second binary number signal proportional to the inverse of the desired motor frequency; and a fourth reciprocal element including a second digital-to-analog converter which receives the second binary number signal and converts the second binary number signal to a second analog voltage signal having magnitude proportional to the desired motor frequency; and wherein the first error voltage signal has amplitude proportional to the difference between the amplitudes of the first analog voltage signal and the second analog voltage signal.

4. The motor control circuit of claim 3, also including:

a phase control loop coupled to the speed control loop, and capable of generating a second error voltage signal having an amplitude proportional to the phase difference between the first clock signal and the second clock signal; and wherein the motor control signal has amplitude proportional to the sum of the amplitudes of the first error voltage signal and the second error voltage signal.

5. The motor control circuit of claim 4, wherein the phase control loop includes:

a ramp generator which receives the second analog voltage signal and integrates the second analog voltage signal to generate a ramp signal;

a sample and hold unit which receives the ramp signal and the first clock signal, and generates a sampled voltage signal by sampling the ramp signal at the measured motor frequency; and means for amplifying the sampled voltage signal, wherein the amplified sampled voltage signal is the second error voltage signal.

6. A motor control circuit, for generating a motor control signal from a first clock signal indicative of the measured phase and frequency of a motor and a second clock signal indicative of a desired operating frequency for the motor, including:

a speed control loop for generating a first error voltage signal having an amplitude proportional to the difference between the frequency of the first clock signal and the frequency of the second clock signal;

a phase control loop coupled to the speed control loop, and capable of generating a second error voltage signal having an amplitude proportional to the phase difference between the first clock signal and the second clock signal; and means for summing a first signal having amplitude proportional to the amplitude of the first error voltage signal, with a second signal having amplitude proportional to the amplitude of the second error voltage signal, to generate the motor control signal.

7. The circuit of claim 6, wherein the phase control loop includes:

a ramp generator which generates a ramp signal having a substantially constant maximum amplitude regardless of variations in the frequency of the second clock signal; and a sample and hold unit which receives the ramp signal and the first clock signal, and generates a sampled voltage signal by sampling the ramp signal at the measured motor frequency; and wherein the second error voltage signal has amplitude proportional to the sampled voltage signal.

8. The circuit of claim 6, wherein the speed control loop includes a first reciprocal element which introduces a first nonlinearity into the speed control loop, and a second reciprocal element which introduces a second nonlinearity into the speed control loop substantially cancelling the first nonlinearity.

9. The motor control circuit of claim 8, wherein:

the first reciprocal element includes a first digital counter which receives the first clock signal and converts the first clock signal into a first binary number signal proportional to the inverse of the measured motor frequency; and wherein:

the second reciprocal element includes a digital-to-analog converter which receives the first binary number signal and generates from the first binary number signal a first analog voltage signal having magnitude proportional to the measured motor frequency; and wherein the speed control loop includes means for generating the first error voltage signal from the first analog voltage signal and the second clock signal.

10. The motor control circuit of claim 9, wherein the speed control loop also includes:

a third reciprocal element including a second digital counter which receives the second clock signal and converts the second clock signal into a second binary number signal proportional to the inverse of the desired motor frequency; and a fourth reciprocal element including a second digital-to-analog converter which receives the second binary number signal and converts the second binary number signal to a second analog voltage signal having magnitude proportional to the desired motor frequency; and wherein:

the first error voltage signal has amplitude proportional to the difference between the amplitudes of the first analog voltage signal and the second analog voltage signal.

11. A method for generating a motor control signal from a first clock signal, indicative of the measured phase and frequency of a motor, and a second clock signal, indicative of a desired operating frequency for the motor, including the steps of:

(a) generating a first error voltage signal having an amplitude proportional to the difference between the frequency of the first clock signal and the frequency of the second clock signal, by processing the first clock signal and the second clock signal in a speed control loop including first reciprocal element which introduces a first nonlinearity into the speed control loop, and including a second reciprocal element which introduces a second nonlinearity into the speed control loop substantially cancelling the first nonlinearity;

(b) generating a second error voltage signal having an amplitude proportional to the phase difference between the first clock signal and the second clock signal; and (c) generating the motor control signal by summing a first signal having amplitude proportional to the amplitude of the first error voltage signal, with a second signal having amplitude proportional to the amplitude of the second error voltage signal.

12. The method of claim 11, wherein step (a) includes the steps of:

converting the first clock signal into a first binary number signal proportional to the inverse of the measured motor frequency;

generating from the first binary number signal a first analog voltage signal having magnitude proportional to the measured motor frequency; and generating the first error voltage signal from the first analog voltage signal and the second clock signal.

13. The method of claim 12, wherein step (a) also includes the steps of:

converting the second clock signal into a second binary number signal proportional to the inverse of the desired motor frequency;

generating from the second binary number signal a second analog voltage signal having magnitude proportional to the desired motor frequency; and generating the first error voltage signal by subtracting a signal having amplitude proportional to that of the first analog voltage signal from a signal having amplitude proportional that of the second analog voltage signal.

14. The method of claim 11, wherein step (b) includes the steps of:

integrating the second analog voltage signal in a ramp generator to generate a ramp signal;

generating a sampled voltage signal by sampling the ramp signal at the measured motor frequency in a sample and hold unit; and converting the sampled voltage signal into the second error voltage signal by amplifying the sampled voltage signal.

* * * * *